United States Patent
Cazzell et al.

(10) Patent No.: US 6,581,006 B2
(45) Date of Patent: Jun. 17, 2003

(54) SYSTEM AND METHOD FOR BARRIER PROXIMITY DETECTION

(75) Inventors: Gregory A. Cazzell, Dayton, OH (US); Hubert B. Riley, Novi, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/754,690

(22) Filed: Jan. 3, 2001

(65) Prior Publication Data

US 2002/0087268 A1 Jul. 4, 2002

(51) Int. Cl.$^7$ .............................................. G06F 17/00
(52) U.S. Cl. ...................... 701/301; 701/96; 340/425.5; 342/70
(58) Field of Search ........................... 701/301, 96, 93, 701/300; 340/425.5, 435, 436, 438; 342/70

(56) References Cited

U.S. PATENT DOCUMENTS

| | | | | |
|---|---|---|---|---|
| 5,197,562 A | * | 3/1993 | Kakinami et al. | 180/169 |
| 5,216,408 A | * | 6/1993 | Shirakawa | 340/435 |
| 5,424,952 A | * | 6/1995 | Asayama | 701/200 |
| 5,442,348 A | * | 8/1995 | Mushell | 194/205 |
| 5,572,484 A | * | 11/1996 | Gaus et al. | 180/167 |
| 5,675,518 A | * | 10/1997 | Kuroda et al. | 702/97 |
| 5,678,650 A | * | 10/1997 | Ishihara et al. | 180/169 |
| 5,684,473 A | * | 11/1997 | Hibino et al. | 340/903 |
| 5,945,907 A | * | 8/1999 | Yaron et al. | 340/435 |
| 5,969,969 A | * | 10/1999 | Ejiri et al. | 364/424.051 |
| 6,014,601 A | * | 1/2000 | Gustafson | 701/45 |
| 6,091,323 A | * | 7/2000 | Kawai | 340/435 |
| 6,169,940 B1 | * | 1/2001 | Jitsukata et al. | 701/23 |
| 6,188,957 B1 | * | 2/2001 | Bechtolsheim et al. | 701/209 |
| 6,215,415 B1 | * | 4/2001 | Schroder | 250/349 |
| 6,252,520 B1 | * | 6/2001 | Asami et al. | 340/903 |
| 6,285,944 B1 | * | 9/2001 | Tange et al. | |
| 6,289,278 B1 | * | 9/2001 | Endo et al. | |
| 6,317,691 B1 | * | 11/2001 | Narayan et al. | 701/301 |
| 6,326,887 B1 | * | 12/2001 | Winner et al. | 180/167 |

* cited by examiner

*Primary Examiner*—William A Cuchlinski, Jr.
*Assistant Examiner*—Olga Hernandez
(74) *Attorney, Agent, or Firm*—Scott A. McBain

(57) ABSTRACT

A system for barrier proximity detection, comprising a short-range detection (SRD) sensor, a barrier proximity detection system (BPDS) controller, and an operator display and control. The SRD sensor mounted on the vehicle detects the distance to objects and transmits a distance signal to the BPDS controller. The BPDS controller provides an operator control signal to the operator display and control for the driver's use. The BPDS controller may also store preset alarms, distance setpoints, or desired ranges for repeated use. The operator display and control may be a gradient alert display with audible alarms or an alphanumeric display to indicate the distance to an object with a preset target distance. The method provides the steps of measuring a desired range between the front of a vehicle and a barrier and storing the desired range in the BPDS, then using the desired range to provide a clear indication to the driver.

19 Claims, 3 Drawing Sheets

SYSTEM AND METHOD FOR BARRIER PROXIMITY DETECTION

TECHNICAL FIELD

This invention relates generally to the field of indicators mounted on land vehicles providing relative distance to an obstacle, and in particular, to a system and method for barrier proximity detection.

BACKGROUND OF THE INVENTION

Back-up proximity detection systems are becoming more common on consumer and commercial vehicles, often using radar as a back-up aid to prevent accidental collisions with unseen vehicles or stationary objects. Radar sensors and controllers have been developed to economically implement the back-up proximity detection systems.

Although such systems increase driver confidence and reduce potential vehicle damage while backing up a vehicle, they are only directed to the rear of the vehicle. No warning system is provided in the forward direction, even though such a system would be useful in detecting the distance to objects in front of a vehicle, particularly when parking. Existing parking aids use a permanent installation near a stationary barrier to sound an alarm when the vehicle is a certain distance from that barrier. This arrangement only provides an indication when a vehicle approaches a particular barrier, rather than providing the driver with the distance to any barrier.

Accordingly, it would be desirable to have a system and method for barrier proximity detection that overcomes the disadvantages described.

SUMMARY OF THE INVENTION

One aspect of the invention provides a system for barrier proximity detection, comprising a short-range detection (SRD) sensor, a barrier proximity detection system (BPDS) controller, and an operator display and control. The SRD sensor mounted on the front of the vehicle detects the distance to objects and transmits a proximity signal to the BPDS controller. The BPDS controller provides a distance signal to the operator display and control, where the driver can use it. The BPDS controller may also store preset alarms, distance setpoints, or desired ranges for repeated use.

Another aspect of the invention provides an operator display and control wherein the operator display and control further comprises a gradient alert display with audible signals to indicate the distance to an object.

Another aspect of the invention provides an operator display and control wherein the operator display and control further comprises an alphanumeric display to indicate the distance to an object with a preset target distance.

Another aspect of the invention provides the steps determining a desired clearance distance between the front of a vehicle and a barrier, storing the desired clearance distance, determining a measured distance between the a vehicle and barrier, and providing an operator indication when the measured distance is less than or equal to the desired clearance distance.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
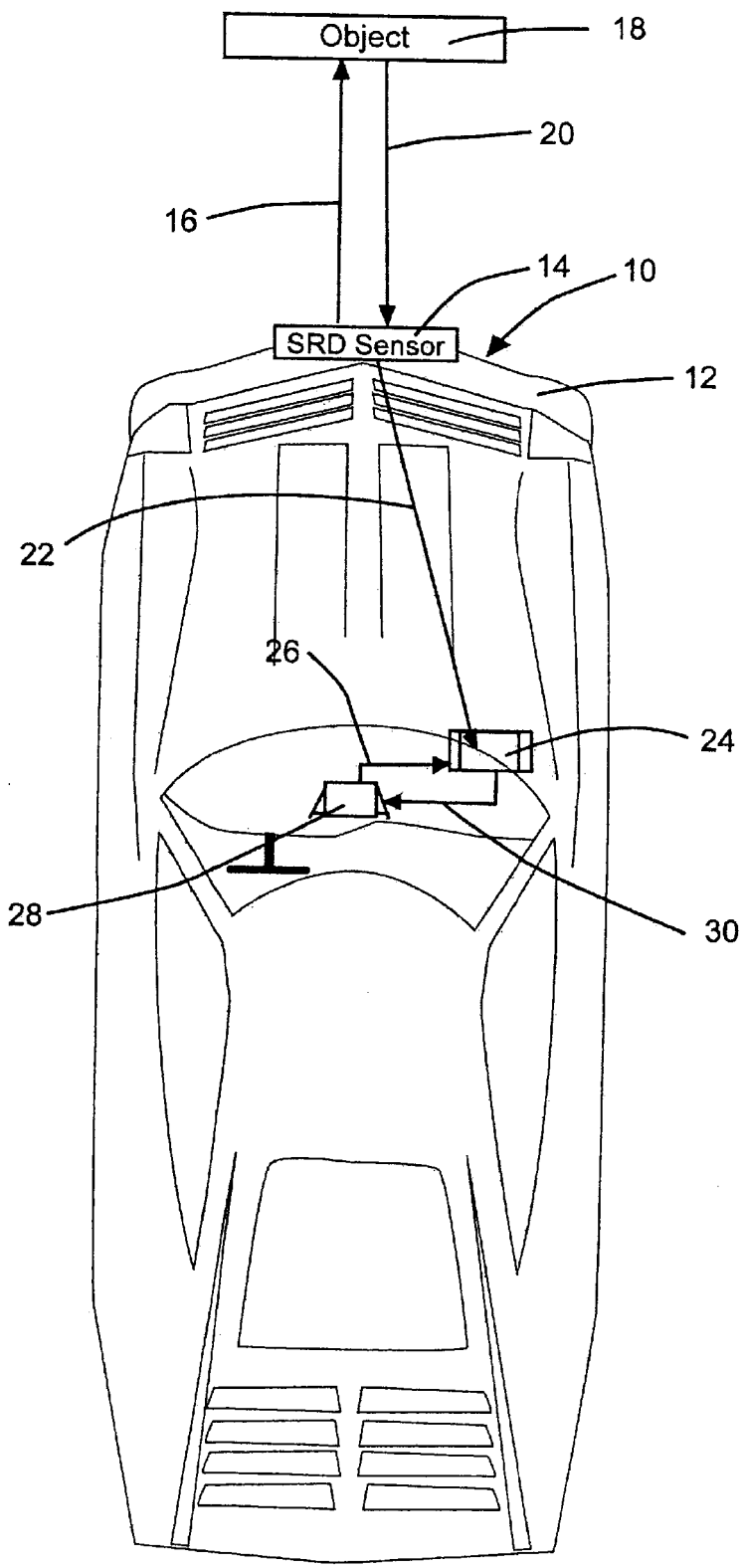
FIG. 1 is a block diagram of a preferred embodiment of a system for barrier proximity detection that is made in accordance with the invention.

FIG. 1 is a block diagram of a system for barrier proximity detection. Vehicle 10 has front bumper 12 with SRD sensor 14 attached. The vehicle 10 could be any vehicle in which proximity information is valuable to the driver, such as cars, trucks, large trucks, farm equipment, or forklifts. The SRD sensor 14 directs a radar signal 16 from the front of the vehicle in order to measure the distance to object 18. The SRD sensor 14 is of the type typically used in back-up warning systems and has a range of 6 meters. The SRD sensor 14 is mounted on the vehicle 10 behind the front bumper 12 (provided the bumper is not metallic) from 15 to 30 inches above the ground. The object 18 can be any object or barrier, such as another vehicle or a garage wall.

The radar signal 16 reflects off object 18 as reflected signal 20. SRD sensor 14 detects the reflected signal 20, converts the reflected signal 20 to distance signal 22, and sends distance signal 22 to BPDS controller 24. The BPDS controller 24 is of the type typically used in back-up warning systems, such as a modified back-up aid (BUA) controller, and may be a computer, microcomputer, or microprocessor, with ROM and RAM and appropriate input and output circuits. The BPDS controller 24 also receives operator control signal 26 from operator display and control 28 and transmits operator display signal 30 to the operator display and control 28.

Figure 4:
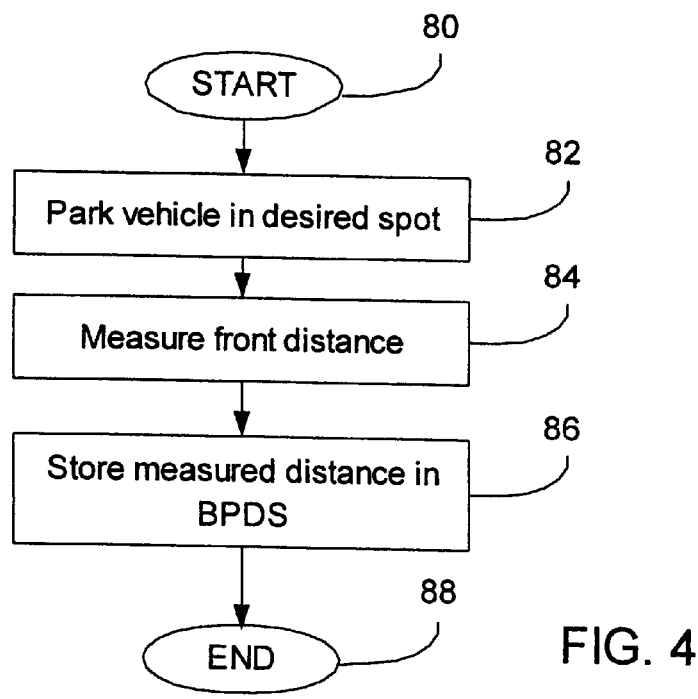
FIG. 4 is a flow chart of a preferred embodiment of a method of calibrating the BPDS for parking a vehicle at a desired distance from an object that is performed in accordance with the invention.

The BPDS controller 24 may store preset alarms, distance setpoints, or desired ranges for repeated use. The preset alarms may be sent to the operator display and control 28 when the measured distance is less than or equal to the distance setpoints or the desired ranges. The distance setpoints may be set at the factory and used to trigger visual and audible indication on the operator display and control 28. The desired ranges can be input by the driver and may be used when parking repeatedly in the same place, like in a garage or an assigned parking space (FIG. 4).

The BPDS controller 24 converts the distance signal 22 to operator display signal 30 before sending the operator display signal 30 to the operator display and control 28. The operator display signal 30 may also include preset alarms or desired ranges from the BPDS controller 24. The operator display and control 28 converts the operator display signal 30 into visual or audible signals for the driver to use in determining the distance to the object 18.

Figure 2:
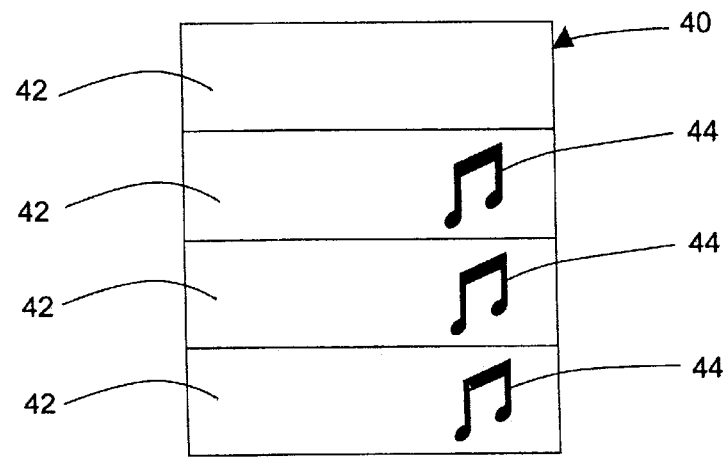
FIG. 2 is an embodiment of an operator display and control as a gradient alert display with audible signals to indicate the distance to an object that is made in accordance with the invention.

FIG. 2 is an embodiment of the operator display and control as a gradient alert display with audible signals to indicate the distance to an object. The operator display and control receives an operator display signal containing distance and alarm information from the BPDS controller as discussed above (FIG. 1). The operator display and control converts the operator display signal to a visual or audible form useable by the driver.

Operator display and control 40 comprises a plurality of display segments 42. The display segments 42 may be arranged linearly. When no object is in front of the vehicle, none of the display segments 42 are activated. As the vehicle comes within range of an object, the first of the display segments 42 activates. Then each of the display segments 42 activates sequentially as the vehicle approaches the object. This provides the driver with a visual indication of the approach.

The way in which the display segments 42 activate may be programmed to fit the desired use. The activation may be linear such that the operator display and control 40 provides a linear display of the distance between the vehicle and the object. Alternatively, the activation may be may be weighted or offset to provide more warning as the distance between the vehicle and the object becomes small.

The display segments 42 may be any discrete or continuous display capable of converting a signal to a visual indication, such as incandescent lights, LEDs, or LCDs. The display segments 42 may be small and responsive to small changes in the operator display signal, so that the indicated approach to the object appears continuous. The display segments 42 may vary in color, brightness, or hue. For example, some of the display segments 42 could be green for the display segments 42 indicating a safe distance and some red for the display segments 42 indicating a critical distance.

The operator display and control 40 may also provide one or more audible alarms 44 to give the driver an audible indication of the vehicle's approach to the object. The audible alarms 44 may vary in pattern, tone, and loudness, increasing in intensity as the distance between the vehicle and the object decreases. As discussed for FIG. 1 above, the BPDS controller stores the distance setpoints and sends a preset alarm when the measured distance reaches the distance setpoint.

Figure 3:
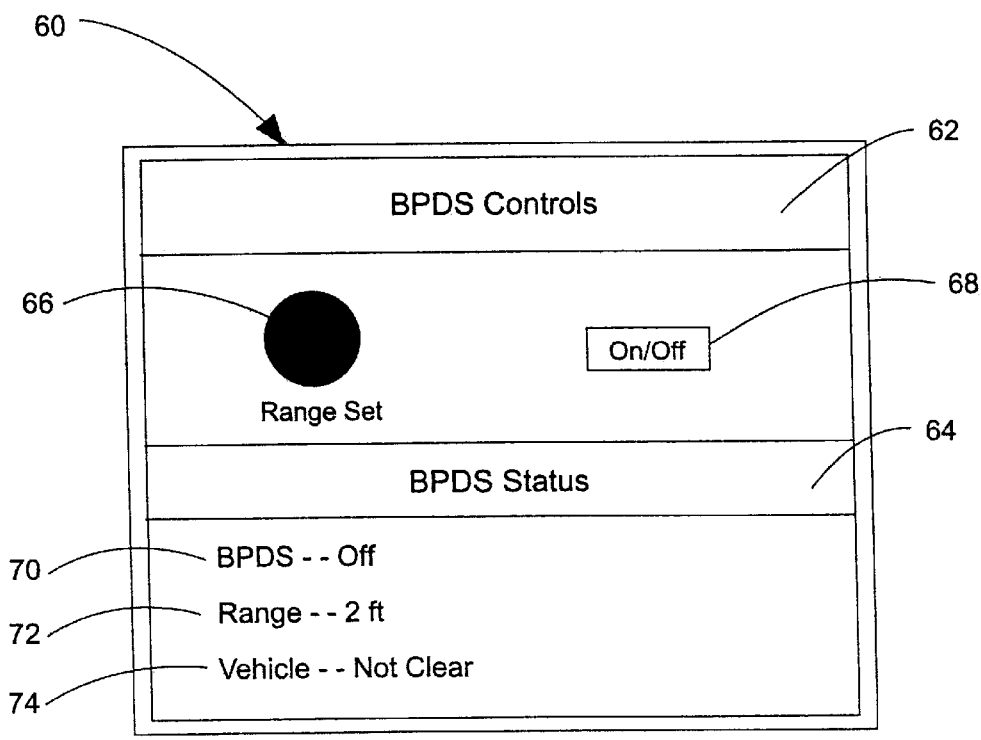
FIG. 3 is an embodiment of an operator display and control as an alphanumeric display to indicate the distance to an object with a preset target distance that is made in accordance with the invention.

FIG. 3 is an embodiment of an operator display and control as an alphanumeric display to indicate the distance to an object with a preset target distance. The operator display and control receives an operator display signal containing distance and alarm information from the BPDS controller and sends an operator control signal to the BPDS controller, as discussed above (FIG. 1). The operator display and control converts the operator display signal to a form useable by the driver and provides the driver's instructions to the system in the operator control signal.

Operator display and control 60 comprises a control portion 62 and a status portion 64. The control portion 62 provides driver input to the system as the operator control signal, while the status portion 64 provides system information to the driver from the operator display signal.

The control portion 62 further comprises range set switch 66 and on/off switch 68. The on/off switch 68 allows the driver to turn the barrier proximity detection system (BPDS) on or off, as required. The BPDS could be turned off when driving on the open road, then turned on when parking in a garage. The range set switch 66 allows the driver to establish a measured distance from the front of the vehicle, so that the vehicle may be parked at a desired range between the vehicle and any object. Use of the range set switch 66 is discussed further in the description of FIG. 4 below.

The status portion 64 of the operator display and control 60 further comprises BPDS status indication 70, range indication 72, and clearance indication 74. The status portion 64 may be made of individual indicators for each piece of information or may be an integrated LCD screen displaying each piece of information on a portion of the screen. The BPDS status indication 70 indicates whether the BPDS is active. The range indication 72 provides an alphanumeric readout of the desired range stored in the BPDS controller. The clearance indication 74 indicates whether the distance between the vehicle and an object is less than the desired range.

FIG. 4 is a flow chart of a method of calibrating the BPDS for parking a vehicle at a desired range from an object, such as parking in a garage, where the desired distance between the vehicle and the garage wall will remain constant.

The vehicle is first pulled into the desired spot, allowing a safe forward distance to the garage wall and sufficient rearward distance to allow the garage door to clear the vehicle (Step 82). Next, the forward distance between the garage wall and the vehicle's front is measured (Step 84). The measurement can be made with a ruler or measured by BPDS itself. The measured front distance is stored in the BPDS controller as the desired range (Step 86) and the sequence ends (Step 88). The desired range may be stored by dialing in a value with the range set switch or may be acknowledged by pushing a button to accept a value if the distance is measured by BPDS. Once the desired range is stored in the BPDS controller, the driver can pull into the garage using the BPDS and be assured that they are a safe distance from the garage wall and clear of the garage door.

Figure 5:
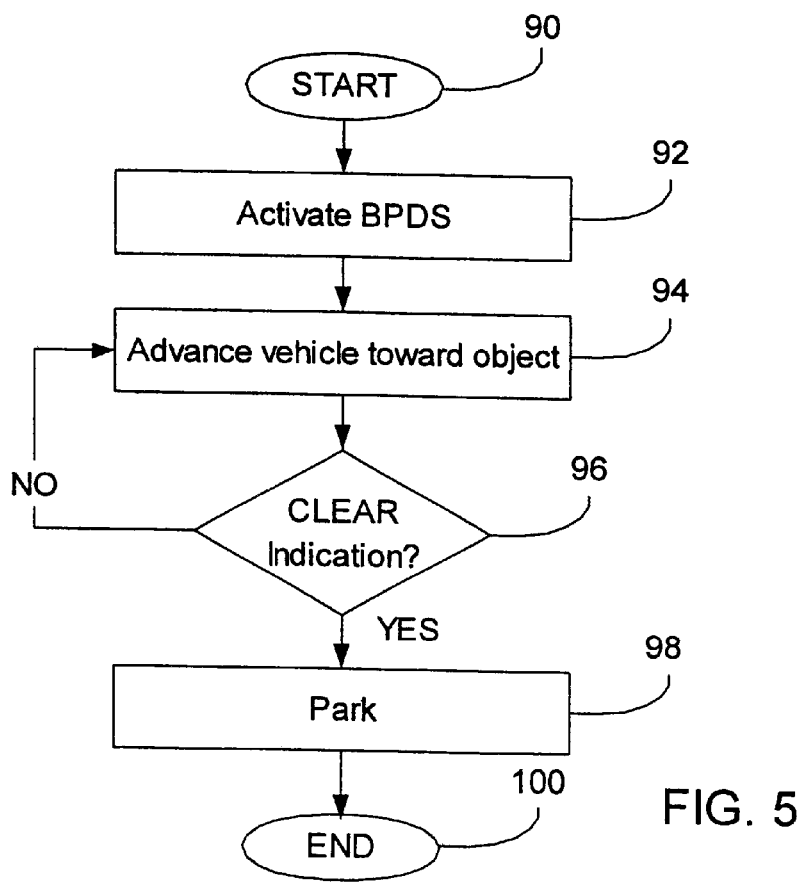
FIG. 5 is a flow chart of a method of using the BPDS for parking a vehicle at a desired distance from an object that is performed in accordance with the invention.

FIG. 5 is a flow chart of a method of using the BPDS for parking a vehicle at a desired range from an object, such as a garage wall, once the desired range has been stored in the BPDS. The driver activates the BPDS (Step 92) and drives the vehicle toward the object (Step 94). The driver monitors the clearance indication (Step 96): If the clearance indication shows the vehicle is not clear, the driver returns to Step 94 and advances the car further. If the clearance indication shows the vehicle is clear, the driver parks the vehicle (Step 98) and the sequence ends (Step 100).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system for barrier proximity detection to monitor distance between a vehicle and an object and to provide information to an operator, comprising:

means for transmitting a radar signal to the object;

means for receiving a reflected signal from the object;

means for generating a distance signal responsive to the radar signal and the reflected signal;

means for generating an operator control signal responsive to operator input;

means for generating an operator display signal responsive to the distance signal and the operator control signal;

means for displaying the operator display signal in a form useable by the operator;

means for storing desired range;

means for comparing the distance signal to the desired range; and means for providing a clearance indication status signal to the operator when the distance signal is less than or equal to the desired range.

2. A system for barrier proximity detection to monitor distance between a vehicle and an object, comprising:

an SRD (short-range detection) sensor for transmitting a radar signal to the object, receiving a reflected signal from the object, and, responsive to the radar signal and the reflected signal, generating a distance signal;

an operator display and control responsive to an operator display signal and generating an operator control signal; and a BPDS barrier proximity detection system) controller programmed to receive the distance signal from the SRD sensor, to receive the operator control signal from the operator display and control, responsive to the operator control signal and the distance signal to generate the operator display signal, and to transmit the operator display signal to the operator display and control.

wherein the operator display and control is an alphanumeric display;

the alphanumeric display further comprises a control portion and a status portion; and the status portion further comprises a BPDS status indication, a range indication, and a clearance indication.

3. The system of claim 2 wherein the SRD sensor is mounted on a front bumper.

4. The system of claim 3 wherein the SRD sensor is mounted behind a front bumper.

5. The system of claim 3 wherein the SRD sensor is mounted from 15 to 30 inches above ground.

6. The system of claim 2 wherein the operator display and control is a gradient alert display.

7. The system of claim 6 wherein the gradient alert display further comprises a plurality of display segments responsive to the operator display signal.

8. The system of claim 2 wherein the SRD sensor has a range of 6 meters.

9. The system of claim 2 wherein the operator display and control further comprises at least one audible alarm.

10. The system of claim 2 wherein the control portion further comprises a range set switch and an on/off switch.

11. The system of claim 2 wherein the BPDS controller is a microprocessor.

12. The system of claim 2 wherein the BPDS controller is a modified back-up aid (BUA) controller.

13. The system of claim 2 wherein the BPDS controller further comprises storage for preset alarms, distance setpoints, and desired ranges.

14. A system for barrier proximity detection to monitor distance between a vehicle and an object and to provide information to an operator, comprising:

means for transmitting a radar signal to the object;

means for receiving a reflected signal from the object;

means for generating a distance signal responsive to the radar signal and the reflected signal;

means for generating an operator control signal responsive to operator input;

means for generating an operator display signal responsive to the distance signal and the operator control signal; and means for displaying the operator display signal in a form useable by the operator;

wherein the operator display signal display means is an alphanumeric display;

the alphanumeric display further comprises a control portion and a status portion; and the status portion further comprises a BPDS status indication, a range indication, and a clearance indication.

15. The system of claim 14 further comprising:

means for storing a desired range;

means for comparing the distance signal to the desired range; and means for providing a clearance indication status signal to the operator when the distance signal is less than or equal to the desired range.

16. A method for calibrating a barrier proximity detection system (BPDS) for parking a vehicle at a desired range from an object, comprising the steps of:

providing the BPDS mounted on the vehicle;

positioning the vehicle at a safe parking distance from the object;

measuring a distance between the vehicle and the object; and storing the measured distance in the BPDS as the desired range to calibrate the BPDS;

wherein the BPDS comprises an SRD (short-range detection) sensor for transmitting a radar signal to the object, receiving a reflected signal from the object, and, responsive to the radar signal and the reflected signal, generating a distance signal;

an operator display and control responsive to an operator display signal and generating an operator control signal; and a BPDS (barrier proximity detection system) controller programmed to receive the distance signal from the SRD sensor, to receive the operator control signal from the operator display and control, responsive to the operator control signal and the distance signal to generate the operator display signal, and to transmit the operator display signal to the operator display and control.

17. The method of claim 16, wherein the operator display and control is an alphanumeric display;

the alphanumeric display further comprises a control portion and a status portion; and the status portion further comprises a BPDS status indication, a range indication, and a clearance indication.

18. A method for using a barrier proximity detection system (BPDS) for parking a vehicle at a desired range from an object, comprising the steps of:

providing the BPDS mounted on the vehicle;

activating the BPDS to use the BPDS for parking;

moving the vehicle toward the object;

determining whether clearance indication shows the vehicle to be clear; and moving the vehicle further toward the object if the clearance indication shows the vehicle is not clear;

wherein the BPDS comprises an SRD (short-range detection) sensor for transmitting a radar signal to the object, receiving a reflected signal from the object, and, responsive to the radar signal and the reflected signal, generating a distance signal;

an operator display and control responsive to an operator display signal and generating an operator control signal; and a BPDS (baffler proximity detection system) controller programmed to receive the distance signal from the SRD sensor, to receive the operator control signal from the operator display and control, responsive to the operator control signal and the distance signal to generate the operator display signal, and to transmit the operator display signal to the operator display and control.

19. The method of claim 18 wherein the operator display and control is an alphanumeric display;

the alphanumeric display further comprises a control portion and a status portion; and the status portion further comprises a BPDS status indication, a range indication, and a clearance indication.

* * * * *